(12) United States Patent
Petriv et al.

(10) Patent No.: US 11,074,733 B2
(45) Date of Patent: Jul. 27, 2021

(54) FACE-SWAPPING APPARATUS AND METHOD

(71) Applicant: NeoCortext Inc., Wilmington, DE (US)

(72) Inventors: Oles Petriv, Kyiv (UA); Nazar Shmatko, Zaporizhzhia (UA)

(73) Assignee: Neocortext, Inc., Wilmington, DE (US)

( * ) Notice: Subject to any disclaimer, the term of this patent is extended or adjusted under 35 U.S.C. 154(b) by 86 days.

(21) Appl. No.: 16/355,276

(22) Filed: Mar. 15, 2019

(65) Prior Publication Data

US 2020/0294294 A1    Sep. 17, 2020

(51) Int. Cl.
*G06T 11/60* (2006.01)
*G06K 9/00* (2006.01)
(Continued)

(52) U.S. Cl.
CPC .......... *G06T 11/60* (2013.01); *G06K 9/00281* (2013.01); *G06K 9/6202* (2013.01); *G06K 9/6232* (2013.01); *G06N 3/08* (2013.01)

(58) Field of Classification Search
CPC ......... G06T 11/60; G06T 11/001; G06T 5/00; G06T 11/00; G06T 2207/20036;
(Continued)

(56) References Cited

U.S. PATENT DOCUMENTS 5,850,463 A    12/1998 Horii
6,876,755 B1    4/2005 Taylor
(Continued)

FOREIGN PATENT DOCUMENTS

CN    104125392    10/2014
CN    107610240    1/2018
(Continued)

OTHER PUBLICATIONS

SwapItUp: A Face Swap Application for Privacy Protection Sachit Mahajan ; Ling-Jyh Chen ; Tzu-Chieh Tsai 2017 IEEE 31st International Conference on Advanced Information Networking and Applications (AINA) (Year: 2017).*
(Continued)

*Primary Examiner* — Michael J Vanchy, Jr.
(74) *Attorney, Agent, or Firm* — Fitch, Even, Tabin & Flannery LLP

(57) ABSTRACT

A control circuit access a source image that includes a source face and an image to be modified that includes a face to be modified. The control circuit then employs a trained identity encoder to transform at least a part of the source image into a corresponding identity vector and then also employs an attribute encoder to form an attribute feature vector that represents characterizing information for a plurality of features of the image to be modified. The control circuit then employs an image generator to decode the attribute feature vector to obtain the characterizing information for the plurality of features of the image to be modified and to then modify the identity vector as a function of the characterizing information for the plurality of features of the image to be modified to provide a resultant image that includes a resultant face that is essentially the face of the image to be modified but with facial features that emulate corresponding facial features of the source face.

20 Claims, 3 Drawing Sheets

(51) Int. Cl.
  *G06K 9/62* (2006.01)
  *G06N 3/08* (2006.01)
(58) Field of Classification Search
  CPC ....... G06T 2207/20221; G06T 2210/44; G06T 3/0056; G06T 3/0093; G06T 5/005; G06T 5/50; G06K 9/00281; G06K 9/00228; G06K 9/00308; G06K 9/6202; G06K 9/6232; G06N 20/00; G06N 3/08; A63F 13/25; A63F 13/655; A63F 2300/5553
  See application file for complete search history.

(56) References Cited

U.S. PATENT DOCUMENTS

| | | | |
|---|---|---|---|
| 9,336,583 | B2 | 5/2016 | Huang |
| 9,367,940 | B2 | 6/2016 | Weng |
| 9,478,054 | B1 | 10/2016 | Lewis |
| 9,508,197 | B2 | 11/2016 | Quinn |
| 9,922,432 | B1 | 3/2018 | Risser |
| 10,158,797 | B2 | 12/2018 | Baghert |
| 10,552,977 | B1* | 2/2020 | Theis ................. G06K 9/00228 |
| 2004/0013303 | A1* | 1/2004 | Lienhart ............. G06K 9/6269 382/224 |
| 2007/0230794 | A1 | 10/2007 | McAlpine |
| 2012/0299945 | A1 | 11/2012 | Aarabi |
| 2015/0347819 | A1* | 12/2015 | Yin .................... G06K 9/00288 382/118 |
| 2018/0068178 | A1 | 3/2018 | Theobalt |
| 2018/0365874 | A1 | 12/2018 | Hadap |
| 2019/0005305 | A1 | 1/2019 | Huang |
| 2019/0005632 | A1 | 1/2019 | Huang |
| 2020/0293761 | A1* | 9/2020 | Li ..................... G06K 9/00926 |

FOREIGN PATENT DOCUMENTS

| | | |
|---|---|---|
| CN | 108537126 | 9/2018 |
| CN | 108711180 | 10/2018 |
| KR | 20020007735 | 1/2002 |
| KR | 20020007744 | 1/2002 |
| KR | 20020014844 | 2/2002 |
| KR | 101212110 | 12/2012 |
| WO | 2013127418 | 9/2013 |

OTHER PUBLICATIONS

Attribute-Guided Face Generation Using Conditional CycleGAN Yongyi Lu, Yu-Wing Tai, Chi-Keung Tang; Proceedings of the European Conference on Computer Vision (ECCV), 2018, pp. 282-297 (Year: 2018).*
FSNet: An Identity-Aware Generative Model for Image-based Face Swapping Ryota Natsume, Tatsuya Yatagawa, Shigeo Morishima 20 pages; Asian Conference of Computer Vision 2018 (Year: 2018).*
Natsume, et al.; "FSNet: An Identity-Aware Generative Model for Image based face swapping;" arXiv.org>cs>arXiv:1811.12666, Nov. 30, 2018 (20 pgs.).
Olszewski, et al.; "Realistic Dynamic Facial Textures from a Single Image using GANs;" 2017 IEEE International Conference on Computer Vision (ICCV); Oct. 2017 (10 pgs.).
Lu et al. Attribute-Guided Face Generation Using Conditional CycleGAN. 1-20 The European Conference on Computer Vision (ECCV), 2018, pp. 282-297 [online]. [retrieved on May 19, 2020]. Retrieved from the Internet <URL: http://openaccess.thecvf.com/content_ECCV_2018/papers/Y ongi_Lu_Attribute-Guided_Face_Generation_ECCV_2018_paper.pdf>, entire document, especially abstract and p. 5, para 1-3, p. 6 to p. 16.
Natsume et al. FSNet: An Identity-Aware Generative Model for Image-based Face Swapping. 1-20 Asian Conference on Computer Vision, ACCV 2018: Computer Vision—ACCV 2018 pp. 117-132 [online], [retrieved on May 19, 2020]. Retrieved from the Internet <URL: https://arxiv.org/pdf/1811.12666.pdf>, entire document, especially abstract and p. 7, para 2-4, to p. 16.
PCT Patent Application No. PCT/US20/22656; International Search Report and Written Opinion dated Jun. 16, 2020; 8 pages.

* cited by examiner

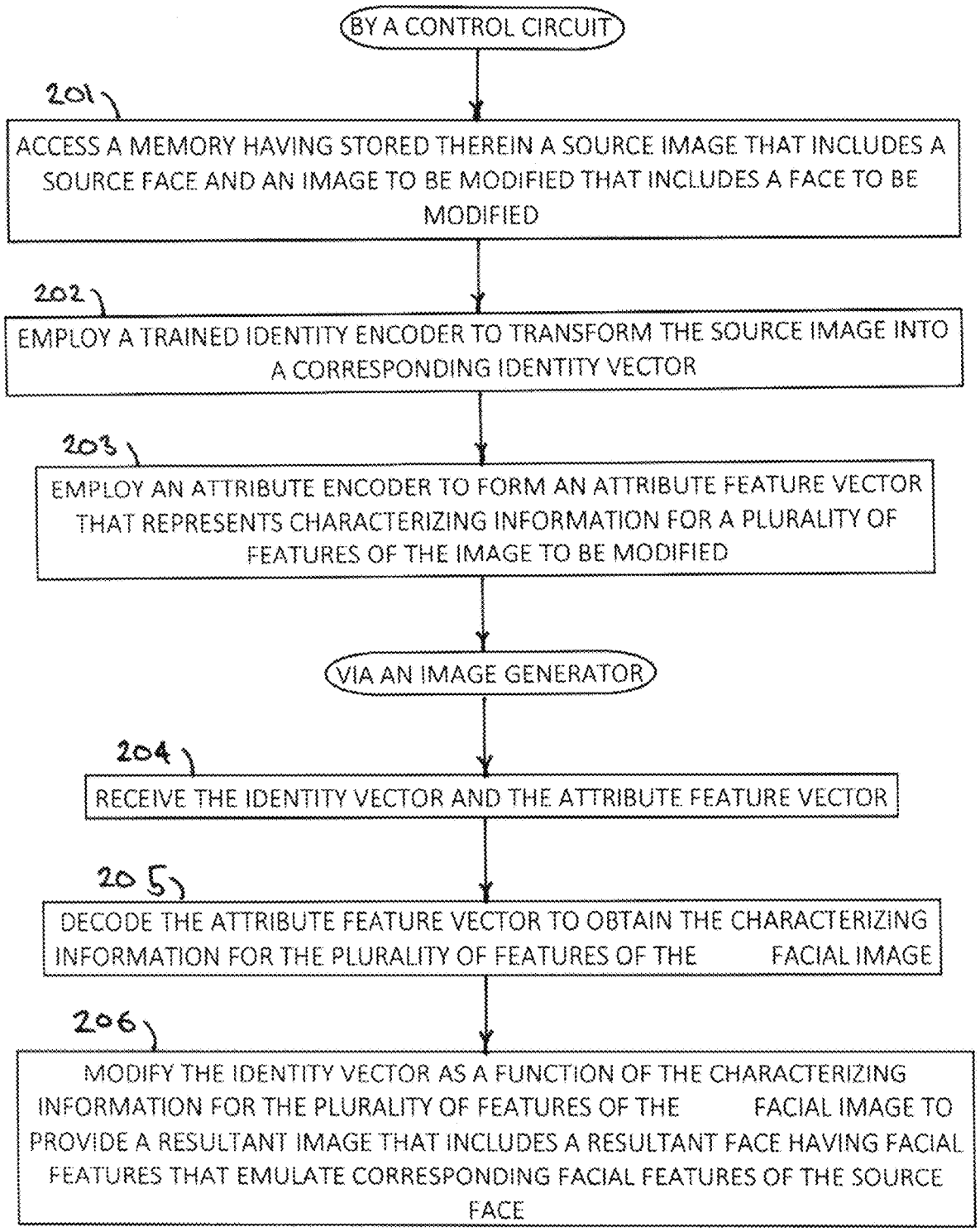

FACE-SWAPPING APPARATUS AND METHOD

TECHNICAL FIELD

These teachings relate generally to the swapping of one face for another in an image.

BACKGROUND

Face swapping is a known prior art endeavor. Generally speaking, face swapping refers to changing the face of a person in an image to be the face of another person. Face swapping can provide, for example, a source of entertainment by allowing users to substitute their own face for the face of a subject in a famous painting, poster, photograph, or the like.

Simple cut- and paste approaches can be used to swap faces in this manner. Such an approach, however, faces any number of challenges in terms of achieving a high-quality result. These challenges include differences between the two facial poses, lighting, and color.

Other approaches to face swapping are also known in the art. Unfortunately, though perhaps useful in at least some application settings, none of these prior art approaches appear to be fully satisfactory in all cases. For example, the quality of the end result may be insufficient and result in an unconvincing resultant image. As another example, the prior art analysis and rendering process may be too time-consuming, too consumptive of computational resources, and/or too prone to inconsistent results. And as yet another example, the final results of a typical prior art process may be of unsuitable resolution and/or incapable of useful scaling in size.

BRIEF DESCRIPTION OF THE DRAWINGS

The above needs are at least partially met through provision of the face-swapping apparatus and method described in the following detailed description, particularly when studied in conjunction with the drawings, wherein:

FIG. 2 comprises a flow diagram as configured in accordance with various embodiments of these teachings;

Figure 1:
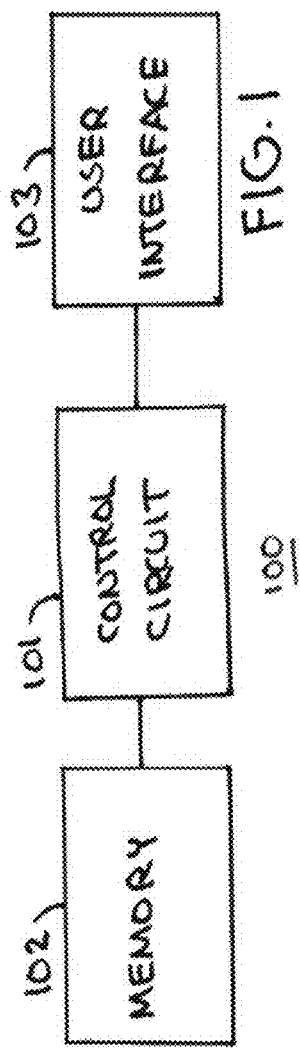
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, these various embodiments serve to automatically modify facial features of a first facial image to emulate corresponding facial features of the second facial image, hence facilitating the swapping of a face from one image to the other. By one approach, these teachings provide for using a control circuit to access a memory having stored therein a source image that includes a source face and an image to be modified that includes a face to be modified. In some embodiments, the control circuit then employs a trained identity encoder to transform at least a part of the source image into a corresponding identity vector.

In some aspects, the control circuit also employs an attribute encoder to form an attribute feature vector that represents characterizing information for a plurality of features of the image to be modified. In addition, by one approach, the control circuit employs an image generator to receive the aforementioned identity vector and attribute feature vector. In certain aspects, the image generator is configured to decode the attribute feature vector to obtain the characterizing information for the plurality of features of the image to be modified and then modify the identity vector as a function of the characterizing information for the plurality of features of the image to be modified to provide a resultant image that includes a resultant face that is essentially the face of the image to be modified but with facial features that emulate corresponding facial features of the source face.

By one approach, the identity encoder comprises a trained identity encoder that includes a deep convolutional neural network. The identity vector can constitute a dense vector (having, for example, a size greater than 500 numbers with double precision). By one exemplary approach, the trained identity encoder employs five levels of down sampling with residual connections in each level. It will be appreciated that, in some embodiments, four, three, or less levels of down sampling may be employed. By one approach the identity vector only represents facial features that are responsible for personal identification and does not, for example, represent information such as facial pose information, image color, or image lighting.

By one approach, the aforementioned attribute encoder comprises an untrained attribute encoder. The attribute encoder can be configured to form the attribute feature vector via sampling using predictive values and mean and variance information for features in the image to be modified. By one approach, the attribute encoder is configured to obtain features that describe non-personally identifying attributes of an image.

The aforementioned image generator can be configured, by one approach, to modify the identity vector as a function of the characterizing information for the plurality of features of the image to be modified to provide a resultant image that includes a resultant face having facial features that emulate corresponding facial features of the source face by, at least in part, modifying only facial features that require change in order to match information in the identity vector.

In many cases these teachings prove superior to prior art approaches at least with respect to achieving extremely high quality resolution results that are highly scalable. So configured, the described approach is also readily applied without any need for retraining to accommodate any unique aspects of new images/faces. These teachings also avoid the need for any special data sets; that is, there is no need to collect a large number of facial photos for each person involved in the planned swap. Instead, only one facial image is needed to make a high-quality face swap.

These teachings are also highly insensitive to facial poses, lighting, and-or color in the source image. Instead, by one approach these teachings can be applied to maintain the original facial expression, lighting, colors, and so forth as tend to characterize the image to be modified.

These and other benefits may become clearer upon making a thorough review and study of the following detailed description. Referring now to the drawings, and in particular to FIG. 1, an illustrative apparatus 100 that is compatible with many of these teachings will now be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

In this illustrative example the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to the image information described herein, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

The control circuit 101 also operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information, such as rendered/resultant images that include a swapped face, to a user.

Figure 3:
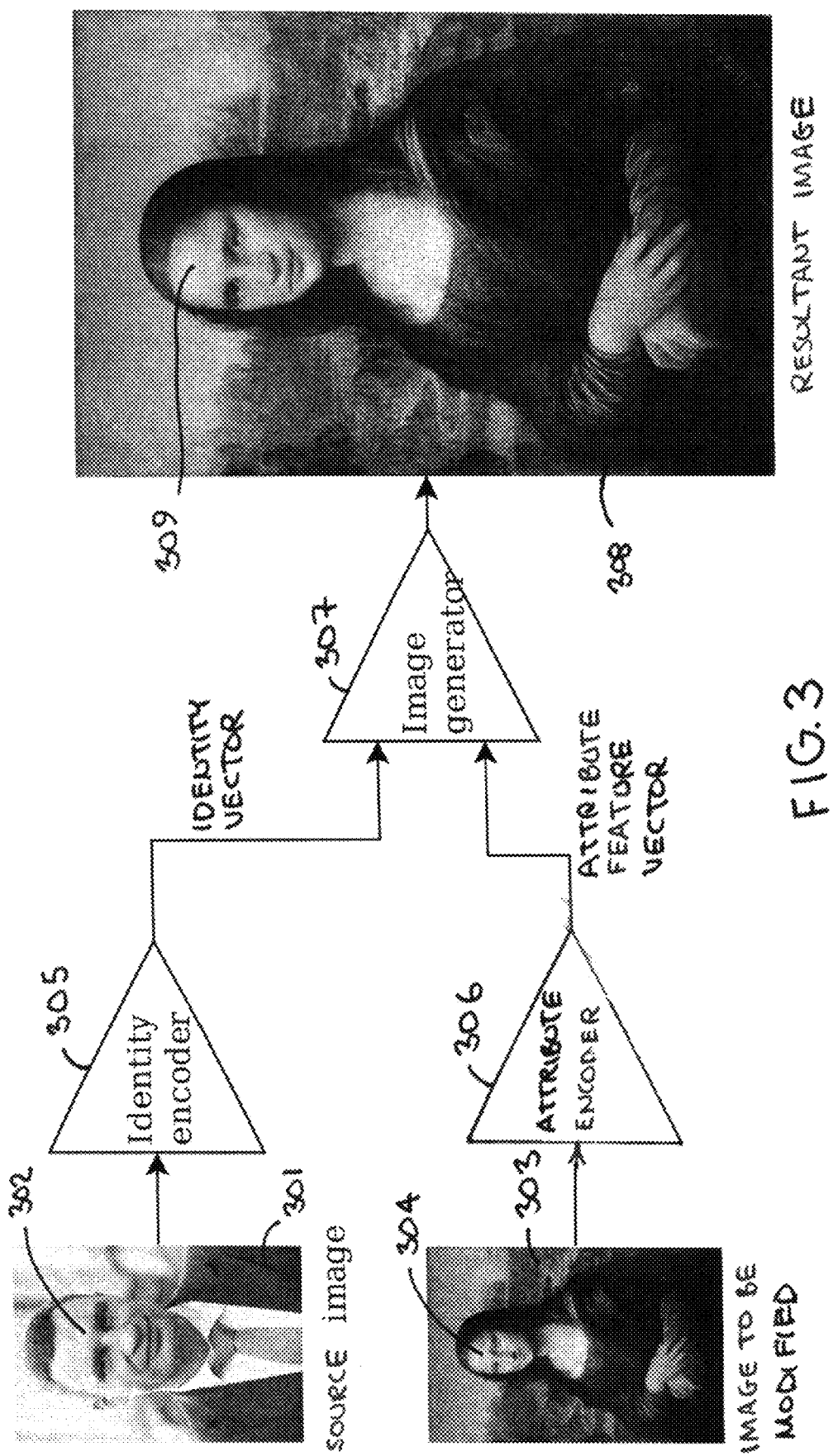
FIG. 3 comprises a schematic representation as configured in accordance with various embodiments of these teachings.

This control circuit 101 can be configured to carry out the process 200 shown in FIG. 2 while FIG. 3 provides a helpful accompanying illustration. Referring now to FIGS. 1-3, at block 201 the control circuit 101 accesses the memory 102 to obtain a source image 301 that includes a source face 302 and to also obtain an image to be modified 303 that includes a face to be modified 304. These images can be stored using any of a variety of formats.

At block 202, the control circuit 101 employs a trained identity encoder 305 to transform the source image 301 into a corresponding identity vector. In this example the identity encoder 305 can comprise a deep convolutional neural network that has been trained to identify people by their faces. This training can comprise training with respect to many thousands of faces of different people where there may be hundreds of images from different angles and under different conditions for at least some of the individual persons. As a point of reference, when two identity vectors are identical or sufficiently close to one another, such an identity encoder will interpret that result to mean that the two faces that were transformed into those two identity vectors are the face of the same person.

The training of the identity encoder 305, may use various following loss functions. In one approach, the training of the identity encoder 305 uses a Reconstruction loss that consists of Perceptual Loss on VGG19 features, Contextual Loss on VGG19 features, and L1 Loss on VGG19 features. The Reconstructed loss may be used between generated attribute features. In one aspect, the Reconstructed loss may be applied with face masks that occlude the face from analysis and concentrate attention on non-facial features.

In another approach, the training of the identity encoder 305 may use an Identity loss that consists of Cosine Loss and Mean Square Error Loss between the identity vector of identity image and the generated image. In yet another approach, the training of the identity encoder 305 may use Adversarial loss, namely, Least Squares Generative Adversarial Network Loss. In still another approach, the training of the identity encoder 305 may use Feature matching loss that consists of Perceptual loss on Discriminator features. In one approach, the Feature matching loss may be used between Discriminator features of real and synthesized images.

By one approach, the identity encoder 305 consists of five levels (in some approaches, four levels, in some approaches three levels, etc.) of down sampling with residual connections in each level. By one approach, as the applicable objective function, these teachings can employ angular margin softmax loss (sometimes also referred to as angular margin sphere loss). The general use of such an objective function in facial analysis is known in the art and requires no further elaboration here.

The identity vector provided by the identity encoder 305 comprises a dense vector having a size, for example, greater than 500 numbers with double precision (such as, for example, a size of 512 bits). Pursuant to these teachings, the contents of the identity vector are invariant to (and do not represent) such things as the facial pose, image color, lighting, and other such parameters of the image. Instead, the identity vector represents only those dimensionally-based facial features that are responsible for personal identification (such as lips, eyes, nose, and eyebrows).

At block 203, the control circuit 101 employs an attribute encoder 306 to form an attribute feature vector that represents characterizing information for a plurality of features of the image to be modified 303. Unlike the identity encoder 305, the attribute encoder 306 can comprise an untrained attribute encoder.

Also unlike the identity encoder 305, the attribute encoder 306 can be configured to obtain features that describe non-personally identifying attributes of the image and to include such content in the resultant attribute feature vector. So, for example, the attribute feature vector can include encoded information representing features that describe such things as the facial pose, lighting, color, and so forth.

By one approach the foregoing features are represented in the attribute feature vector in terms of mean and variance with respect to a normal distribution for the particular represented aspect. In such a case the attribute feature vector can be obtained by sampling using predicted values of mean and variance.

By one approach the attribute feature vector is identical in size to the identity vector. For example, both vectors may have a size of 512 bits.

The remaining steps of this process 200 are carried out by the control circuit 101 when configured as an image generator 307. At block 204, the image generator 307 receives the aforementioned identity vector and attribute feature vector. At block 205, the image generator 307 decodes the attribute feature vector to obtain the characterizing information for the represented plurality of features of the corresponding facial image. And at block 206 the image generator 307 modifies the identity vector as a function of the characterizing information for the plurality of represented features of the facial image 304 in the image to be modified 303 to provide a resultant image 308 that includes a resultant face 309 having facial features that emulate corresponding facial features of the source face 302.

Accordingly, the image generator 307 serves to recognize the information encoded in the attribute feature vector and to modify the identity vector information to achieve a face-swapped image. Those skilled in the art will note and appreciate that the image generator decoder modifies only the facial features that need to be changed in terms of recognizing a particular person, such as the lips, eyes, nose, and eyebrows. Other aspects of the image to be modified 303 that do not pertain to personal identification (such as, in this example, color and texture, lighting, facial pose, gender cues, and even hair length, color, and style) remain as they were in the original image to be modified 303.

The resultant image 308 can be a seamless swapping of faces. It will also be appreciated that the resultant image 308 can be readily resized to a significant extant without significant diminution in quality. For example, these teachings will readily accommodate sizes of 256×256×3 tensors as compared to a prior art approach that may accommodate no more than, say, a size of 128×128×3 tensors.

Figure 4:
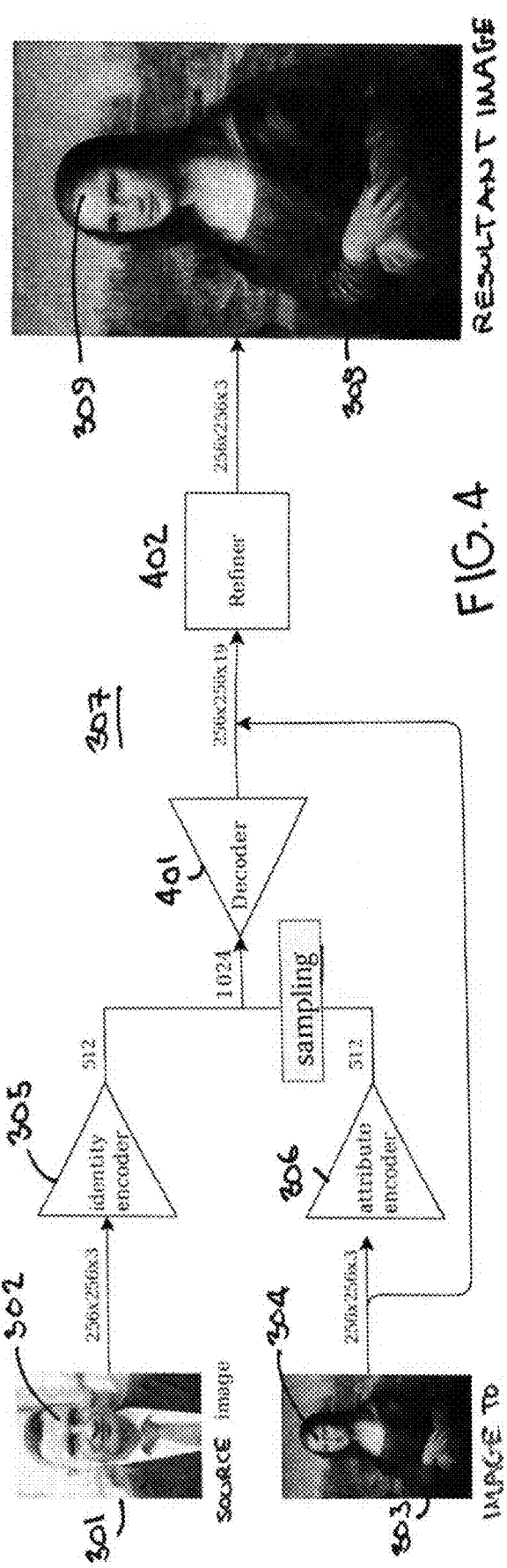
FIG. 4 comprises a schematic representation as configured in accordance with various embodiments of these teachings.

FIG. 4 presents additional details as regards the image generator 307. It will be understood that these specific details are provided for the sake of an illustrative example and are not intended to suggest any particular limitations in these regards.

In this example, both images 301 and 303 are sized at 256×256×3 tensors. Also, in this example, the resultant vectors have a size of 512 bits.

In this example, the attribute encoder 306 comprises a deep convolutional neural network with several down sampling layers. The identity vector is concatenated with the attribute feature vector to produce a concatenated vector having, in this example, a size of 1024 bits.

The concatenated vector is provided to a decoder 401 that comprises a part of the image generator 307. The decoder 401 projects the concatenated vector to a 16-channel feature tensor having a resolution of 256×256. This decoder 401 can comprise a deep convolutional neural network having several up-sampling layers. This 16-channel feature tensor is then joined with the original image to be modified 303 to obtain a 19-channel feature tensor having 256×256×19 tensors.

A refiner 402 (that also comprises a part of the image generator 307) then converts that 19-channel feature tensor to produce the final swapped image having a size of 256× 256×3 tensors. In this example the refiner 402 is a deep convolutional neural network having several residual connections and that utilizes a CycleGAN architecture to help avoid image artifacts possibly introduced in previous processing. (GAN refers to a generative adversarial network and constitutes an approach where two neural networks contest with each other in a zero-sum game framework to achieve a particular image-based result.)

Accordingly, the image generator 307 can use a combination of different loss functions as an objective. Examples include but are not limited to adversarial loss (to help make the resultant image more natural), identity loss (such as a cosine loss responsible for personal identification), and reconstruction loss (for example, a combination of least absolute deviations, perceptual, and contextual losses responsible for transfer attributes such as the original facial expression, lighting, colors, and so forth).

So configured, the image generator 307 can manipulate facial features by interpolating between the facial features of the source image 301 and the image to be modified 303 to achieve an effective and smooth incorporation of the features from the former to the latter.

Those skilled in the art will recognize that a wide variety of modifications, alterations, and combinations can be made with respect to the above described embodiments without departing from the scope of the invention. As one example, these teachings can be employed with video content and gif images to swap faces. In such a case, to achieve acceptable frame consistency one can stabilize landmarks (such as key points on the face) using prediction based upon neighboring frames using the Lucas-Kanade optical flow algorithm. Accordingly, such modifications, alterations, and combinations are to be viewed as being within the ambit of the inventive concept.

What is claimed is:

1. A face-swapping apparatus that can automatically modify facial features of a first facial image to emulate corresponding facial features of a second facial image comprising:
   a memory having stored therein a source image that includes a source face and an image to be modified that includes a face to be modified, wherein the source image is a still photo image, and wherein the image to be modified is a video frame of video content;
   a control circuit operably coupled to the memory and configured to:

employ a trained identity encoder to transform the source image into a corresponding identity vector, wherein the identity encoder is trained using a plurality of images each having a different face thereon and not including an image having the source face thereon;

employ an attribute encoder to form an attribute feature vector that represents characterizing information for a plurality of features of the image to be modified, wherein the attribute encoder is trained using a video content loss function, the video content loss function including at least one of perceptual loss, contextual loss, L1 loss, identity loss, adversarial loss, and feature matching loss;

employ an image generator to receive the identity vector and the attribute feature vector, the image generator being trained using the video content loss function jointly with the attribute encoder and being configured to:

decode the attribute feature vector to obtain the characterizing information for the plurality of features of the image to be modified;

modify the identity vector as a function of the characterizing information for the plurality of features of the image to be modified; and provide a resultant image that includes a resultant face having facial features that emulate corresponding facial features of the source face;

wherein the control circuit is configured to employ the image generator to decode the attribute feature vector, modify the identity vector, and provide the resultant image that includes the resultant face having the facial features that emulate the corresponding facial features of the source face without retraining any of the identity encoder, the attribute encoder, and the image generator using the image having the source face thereon.

2. The face-swapping apparatus of claim 1, wherein the trained identity encoder includes a deep convolutional neural network.

3. The face-swapping apparatus of claim 2, wherein the identity vector constitutes a dense vector having a size greater than 500 numbers with double precision.

4. The face-swapping apparatus of claim 1, wherein the identity vector only represents facial features that are responsible for personal identification.

5. The face-swapping apparatus of claim 4, wherein the identity vector does not represent any of facial pose information, image color, and image lighting.

6. The face-swapping apparatus of claim 1, wherein the trained identity encoder employs five levels of down sampling with residual connections in each level.

7. The face-swapping apparatus of claim 1, wherein the attribute encoder comprises an untrained attribute encoder.

8. The face-swapping apparatus of claim 1, wherein the attribute encoder is configured to obtain features that describe non-personally identifying attributes of an image.

9. The face-swapping apparatus of claim 1, wherein the attribute encoder is configured to form the attribute feature vector via sampling using predicted values and mean and variance information for features in the image to be modified.

10. The face-swapping apparatus of claim 1, wherein the image generator is configured to modify the identity vector as a function of the characterizing information for the plurality of features of the first facial image to provide a resultant image that includes a resultant face having facial features that emulate corresponding facial features of the source face by, at least in part, modifying only facial features that require change in order to match information in the identity vector.

11. A face-swapping method that can automatically modify facial features of a first facial image to emulate corresponding facial features of a second facial image comprising:

by a control circuit:

accessing a memory having stored therein a source image that includes a source face and an image to be modified that includes a face to be modified, wherein the source image is a still photo image, and wherein the image to be modified is a video frame of video content;

employing a trained identity encoder to transform the source image into a corresponding identity vector, wherein the identity encoder is trained using a plurality of images each having a different face thereon and not including an image having the source face thereon;

employing an attribute encoder to form an attribute feature vector that represents characterizing information for a plurality of features of the image to be modified, wherein the attribute encoder is trained using a video content loss function, the video content loss function including at least one of perceptual loss, contextual loss, L1 loss, identity loss, adversarial loss, and feature matching loss;

employing an image generator to receive the identity vector and the attribute feature vector, the image generator being trained using the video content loss function jointly with the attribute encoder and being configured to:

decode the attribute feature vector to obtain the characterizing information for the plurality of features of the image to be modified;

modify the identity vector as a function of the characterizing information for the plurality of features of the image to be modified to provide a resultant image that includes a resultant face having facial features that emulate corresponding facial features of the source face;

wherein the control circuit is configured to employ the image generator to decode the attribute feature vector, modify the identity vector, and provide the resultant image that includes the resultant face having the facial features that emulate the corresponding facial features of the source face without retraining any of the identity encoder, the attribute encoder, and the image generator using the image having the source face thereon.

12. The face-swapping method of claim 11, wherein the trained identity encoder includes a deep convolutional neural network.

13. The face-swapping method of claim 12, wherein the identity vector constitutes a dense vector having a size greater than 500 numbers with double precision.

14. The face-swapping method of claim 11, wherein the identity vector only represents facial features that are responsible for personal identification.

15. The face-swapping method of claim 14, wherein the identity vector does not represent any of facial pose information, image color, and image lighting.

16. The face-swapping method of claim 11, wherein the trained identity encoder employs five levels of down sampling with residual connections in each level.

17. The face-swapping method of claim 11, wherein the attribute encoder comprises an untrained attribute encoder.

18. The face-swapping method of claim 11, wherein the attribute encoder is configured to obtain features that describe non-personally identifying attributes of an image.

19. The face-swapping method of claim 11, wherein the attribute encoder is configured to form the attribute feature vector via sampling using predicted values and mean and variance information for features in the image to be modified.

20. The face-swapping method of claim 11, wherein the image generator is configured to modify the identity vector as a function of the characterizing information for the plurality of features of the first facial image to provide a resultant image that includes a resultant face having facial features that emulate corresponding facial features of the source face by, at least in part, modifying only facial features that require change in order to match information in the identity vector.

* * * * *